United States Patent [19]

Heinz et al.

[11] Patent Number: 5,086,128
[45] Date of Patent: Feb. 4, 1992

[54] HIGH MOLECULAR WEIGHT ARYLENE SULPHIDE POLYMER MELT MIXED WITH AROMATIC NITRO COMPOUND

[75] Inventors: Hans-Detlef Heinz; Burkhard Köhler; Rolf-Volker Meyer, all of Krefeld; Klaus Reinking, Wermelskirchen; Alexa Sommer, Cologne, all of Fed. Rep. of Germany

[73] Assignee: Bayer Aktiengesellschaft, Leverkusen, Fed. Rep. of Germany

[21] Appl. No.: 585,282

[22] Filed: Sep. 18, 1990

Related U.S. Application Data

[63] Continuation of Ser. No. 358,450, May 30, 1989, abandoned.

[30] Foreign Application Priority Data

Jun. 8, 1988 [DE] Fed. Rep. of Germany ....... 3819478

[51] Int. Cl.$^5$ .............................................. C08G 75/16
[52] U.S. Cl. .................................... 525/537; 524/259; 524/260; 524/609; 528/388; 528/481; 528/487; 528/488; 528/492
[58] Field of Search ............... 525/537; 528/388, 487, 528/488, 492, 481; 524/259, 260, 609

[56] References Cited

U.S. PATENT DOCUMENTS 3,395,132  7/1968  Smith ................................. 525/537

Primary Examiner—Harold D. Anderson
Attorney, Agent, or Firm—Connolly & Hutz

[57] ABSTRACT

This invention relates to new high molecular weight arylene sulphide polymers which optionally additionally display improved resistance to UV radiation and are prepared by melting arylene sulphide polymers, preferably PPS, with polynitro compounds or with mononitro compounds containing at least one other substituent capable of reacting with the arylene sulphide polymer.

12 Claims, No Drawings

HIGH MOLECULAR WEIGHT ARYLENE SULPHIDE POLYMER MELT MIXED WITH AROMATIC NITRO COMPOUND

This application is a continuation of application Ser. No. 358,450, filed May 30, 1989.

This invention relates to new high molecular weight arylene sulphide polymers prepared by melting arylene sulphide polymers, preferably PPS, with polynitro compounds or with mononitro compounds containing at least one other substituent capable of reacting with the arylene sulphide polymer.

Arylene sulphide polymers are high temperature resistant thermoplasts which may be mixed to a high percentage with glass fibres and/or mineral fillers.

The use of these polymers, especially polyparaphenylene sulphide (PPS), is increasing, especially in the fields hitherto reserved for duroplasts.

One disadvantage of these polymers is that for some applications they are insufficiently tough although the toughness increases with increasing molecular weight. The very high speed of crystallization of these polymers may also be a disadvantage for various applications, e.g. for the production of sheet products. High molecular weight types of PPS are distinguished, for example, by a reduced speed of crystallization.

Relatively high molecular weight straight chained and branched types of PPS and methods for their preparation are known (e.g. U.S. Pat. No. 3,354,129, EP-OS 171 021).

It is known from U.S. Pat. No. 3,524,835 to increase the molecular weight of polyphenylene sulphides by oxidative after-condensation with air. Variations of this procedure and improvements in individual steps thereof are described, for example, in U.S. Pat. No. 3,793,256, EP-OS 53 385, EP-OS 64 300, EP-OS 91 088 and U.S. Pat. No. 3,699,087.

One disadvantage of this process is that the reaction system is heterogeneous and that the arylene sulphide polymer which is required to be increased in molecular weight is present as a solid and the oxidizing agent is in the gaseous phase. Such a system may result in a non-uniform increase in the molecular weight as well as gelling, lack of homogeneity of the granulate and possibly poor reproducibility of the process.

Furthermore, gaseous oxidizing agents can in some cases only be dosed by expensive procedures.

A process for increasing the molecular weight of PPS is known from U.S. Pat. No. 3,839,301, in which disulphonic acids or disulphonic acid derivatives such as chlorides are used. These reagents may, however, cause an uncontrollably rapid increase in the melt viscosity during the after-treatment so that a reproducible increase in viscosity may be difficult.

Special arylene sulphide copolymers for which nitrohalogenated aromatic compounds may be used as comonomers are known from EP-OS 53 344. These nitrohalogenated aromatic compounds are built into the polymer as comonomers. The resulting copolymers are said to have a reduced tendency to oxidative after-condensation.

It has now been found that when selected polynitro compounds or mononitro compounds containing at least one additional substituent capable of reacting with the polymer are homogeneously incorporated in arylene sulphide polymers, they bring about a rapid but controllable increase in the melt viscosity; the resulting polyarylene sulphides can display considerably improved resistance towards UV radiation.

This invention therefore relates to new high molecular weight arylene sulphide polymers, preferably polyphenylene sulphides, which optionally additionally display improved stability towards UV-radiation and are prepared by the melt-mix 80 to 99.9% by weight, preferably 85 to 99.5% by weight, most preferably 88 to 99% by weight of arylene sulphide polymers, preferably polyphenylene sulphide (PPS), composed of units of formulae (I)–(V)

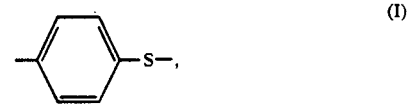
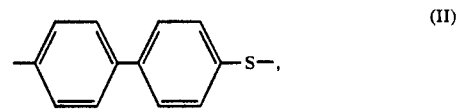
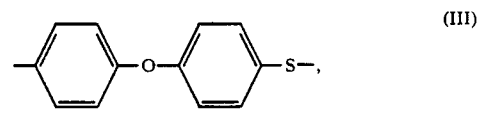
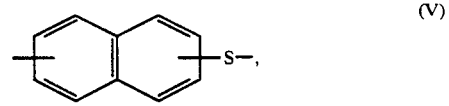

and optionally containing other known comonomers, e.g.

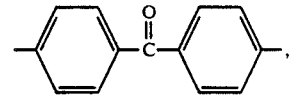
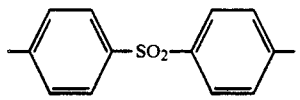

with from 0.1 to 20% by weight, preferably from 0.5 to 15% by weight, most preferably 1 to 12% by weight of special high boiling aromatic, preferably halogen free polynitro compounds and/or mononitro compounds containing at least one other substituent capable of reacting with the arylene sulphide polymers, e.g. SH, $SO_2Cl$ or $SO_3^{\ominus}K^{\oplus}$, the boiling points of the nitro compounds being at least 250° C. and preferably at least 300° C. and if the mononitro compounds contain an $SO_3^{\ominus}$ Group as the substituent capable of further reaction with the arylene sulphide polymers, then the only salts to be used are sodium 3-nitrobenzene sulphonate, potassium 3-nitrobenzene sulphonate, calcium 3-nitrobenzene sulphonates, magnesium 3-nitrobenzene sulphonates, potassium 2-nitrobenzene sulphonate, sodium 2-nitrobenzene sulphonate, the sodium or potassium salt of 2-methyl-5-nitrobenzene sulphonic acid, the sodium or potassium salt of 4-methyl-3-nitrobenzene sulphonic acid, and the sodium, potassium or ammonium salt of 5-nitro-2-naphthalene sulphonic acid.

In one particular embodiment, the reaction for the preparation of the arylene sulphide polymers according to the invention, preferably polyphenylene sulphides, may be continued in a solid phase after-treatment at temperatures from 180° to 260° C. preferably 220° to 260° C., after the solvent-free reaction in the molten state.

It is known from DE-OS 2 903 100 that sulphonate salts, which may contain nitro groups, may be added to polyphenylene sulphides as flame protective agents. Among these sulphonate salts, however, only certain nitro group-containing sulphonates, such as the sodium (potassium, magnesium, calcium) salt of 3-nitrobenzene sulphonic acid or the sodium (potassium, magnesium, calcium) salt of 2-nitrobenzene sulphonic acid may be used according to the invention.

Preparation of the arylene sulphide polymers according to the invention is carried out in the melt, e.g. in extruders, kneaders or other suitable apparatus, optionally at an elevated pressure and at a temperature of about 250° to 450° C., preferably 300° to 360° C.

Examples of substituents capable of reacting with the arylene sulphide polymers include SH, $NO_2$, $SO_3H$, $SO_2Cl$, $So_2NH_2$, $SO_3^\ominus K^\oplus$, $SO_3^\ominus Na^\oplus$ and NR-Ar in which Ar denotes an optionally substituted aryl group having 6 to 14 carbon atoms, e.g. the phenyl group.

The following are examples of mononitro compounds which may be used according to the invention: 3-nitrobenzene sulphonic acid, 4-nitrobenzene sulphonic acid, 3-nitrobenzene sulphonic acid chloride, 3-nitrobenzene sulphonamide, potassium 3-nitrobenzene solphonate, sodium 3-nitrobenzene sulphonate, 3-mercaptonitrobenzene, 3-nitro-4-toluene sulphonic acid, 3-nitro-4-toluene sulphonamide, 3-nitro4-toluene sulphonic acid butylamide, 3-nitro-4-toluene sulphonic acid chloride, potassium 3-nitro-4-toluene sulphonate, sodium 3-nitro-4-toluene sulphonate, 3-mercapto-4-methylnitrobenzene, potassium 2-nitrobenzene sulphonate, 2-nitrobenzene sulphonic acid chloride, 4-nitrobenzene sulphonic acid chloride, 4-chloro-3-nitrobenzene sulphonic acid chloride, 4-chloro-3-nitrobenzene sulphonamide, 2-chloro-5-nitrobenzene sulphonic acid chloride, sodium 2-methyl-5-nitrobenzene sulphonate, 5-nitro-1-naphthalene sulphonic acid, and ammonium 5-nitro-2-naphthalene sulphonate.

The following are examples of polynitro compounds suitable for the purpose of this invention: m-dinitrobenzene, p-dinitrobenzene, 4-methyl-1,3-dinitrobenzene, 4-ethyl-1,3-dinitrobenzene, 3-methyl-1,4-dinitrobenzene, 3-isopropyl-1,4-dinitrobenzene, 4-isopropyl-1,3-dinitrobenzene, 3,5-dinitrobenzoic acid, 3,4-dinitrobenzoic acid, 3,5-dinitrobenzoic acid ethyl ester, 3,5-dinitrobenzoic acid isopropyl ester, 3,5-dinitrobenzoic acid hexyl ester, 3,5-dinitrobenzoic acid dodecyl ester, 3,5-dinitrobenzoic acid octadecyl ester, 3,5-dinitrobenzoic acid behenyl ester (behenyl=$C_{22}$ alkyl group), 3,5-dinitrobenzoic acid amide, 3,5-dinitrobenzoic acid butylamide, 3,5-dinitrobenzoic acid hexylamide, 3,5-dinitrobenzoic acid dodecylamide, 3,5-dinitrobenzoic acid octadecylamide, 3,5-dinitrobenzoic acid behenylamide (behenyl=$C_{22}$ alkyl group), 3,5-dinitrobenzoic acid diethylamide, 3,5-dinitrobenzoic acid-(2-hydroxyethyl) ester, 3,5-dinitrobenzoic acid-(2-hydroxy-1-methyl) ethyl ester, acetic acid-(2,4-dinitro) anilide, propionic acid-(2,4-dinitro)-anilide, oxalic acid-bis-(3-nitro) anilide, oxalic acid-bis-(4-nitro) anilide, oxalic acid-bis-(2,4-dinitro) anilide, succinic acid-bis-(4-nitro) anilide, adipic acid-bis-(4-nitro)-anilide, azelaic acid-bis-(4-nitro) anilide, sebacic acid-bis-(4-nitro) anilide, dodecane dicarboxylic acid-bis-(4-nitro)-anilide, adipic acid-bis-(2,4-dinitro) anilide, mono- and dinitroanilides of dimeric or polymeric fatty acids, 4-nitro-benzoic acid-(4-nitro) phenolate, 3-nitrobenzoic acid-(4-nitro) phenolate, 4-nitrobenzoic acid-(4-nitro) anilide, 3-nitrobenzoic acid-(4-nitro) anilide, 3-nitrobenzoic acid-(4-nitro)-N-methyl anilide, 3-nitro benzoic acid-(4-nitro)-N-phenyl anilide, terephthalic acid-4,4'-bis-4-nitro-anilide, isophthalic acid-4,4'bis-nitroanilide, 1,4-bis-(4-nitro) benzoyl-1,4-phenylene diamine, 2,2'-isopropylidene-bis-(4-nitrophenyloxy) benzene, 1,4-dinitronaphthalene, 1,8-dinitronaphthalene, 1,3-dinitronaphthalene, 1,3-dinitroanthracene, 1,5-dinitroanthracene, 1,8-dinitroanthracene, 4,4'dinitrobiphenyl, 4,4'-dinitrodiphenyl sulphone, 3,3'-dinitrodiphenyl sulphone, 3,3'-dinitrodiphenyl ether, 4,4'-dinitrodiphenyl ether, 4,4'-dinitrodiphenyl sulphide, 4,4'-dinitrodiphenyl solphoxide, 3,3'-dinitrobenzophenone, 4,4'-dinitrobenzophenone, 4,4'-dinitrodiphenyl methane, 2,2'-isopropylidene-bis-(4-nitro) benzene, 2,4-dinitrophenole, 1-methoxy-5-methyl-2,4-dinitrobenzene, 3,4-dinitrobenzamide, 3,4-dinitrobenzophenolate, the methyl ester of 3,4-dinitrobenzoic acid, bis-(4-nitro) benzoyl-1,2-ethylene diamine, bis-(4-nitro) benzoyl-1,4-tetramethylene diamine, bis-(3,5-dinitro) benzoyl-1,6-hexamethylene diamine, bis-(4-nitro) benzoyl-1,2-ethylene glycol, bis-(4-nitro) benzoyl-1,4-butane diol, bis-(4-nitro) benzoyl-1,6-hexane diol, bis-(4-nitro) benzoyl hydroquinone, bis-(4-nitro) benzoyl resorcinol, bis-(3,5-dinitro)-benzoyl-1,2-ethylene glycol, bis-(3,5-dinitro) benzoyl-butane diol, bis-(3,5-dinitrobenzoyl)-1,6-hexane diol, 1,4-bis-(4-nitro) benzoyl-butane, phosphoric acid-tris-(4-nitrophenyl) ester, thiophosphoric acid-tris-(4-nitrophenyl) ester, 1-methoxy-2,4-dinitrobenzene, 1-ethoxy-2,4-dinitrobenzene, 1-methoxy-5-methyl-2,4-dinitrobenzene, 4-methyl-2,6-dinitrophenol, 2,4-dinitro-1-naphthol, 2-hydroxy-3,5-dinitrobenzoic acid, 2-methoxy-3,5-dinitrobenzonitrile, 4-hydroxy-3,5-dinitrobenzoic acid, sodium 2,4-dinitrobenzene sulphonate and sodium 2-methyl-3,5-dinitrobenzene sulphonate.

Preferred nitro compounds are those containing one or more electron accepting groups such as ester groups, amide groups or carboxyl groups in addition to the one or more nitro groups.

The nitro compounds may be used singly or as mixtures.

The reaction time in the melt is from 30 seconds to 600 minutes, preferably from 1 to 100 minutes.

The temperature suitable for the preparation of the arylene sulphide polymers obtained according to the invention is about 290° to 450° C., preferably from 300 to 360° C.

In one particular embodiment of the invention, in which the reaction is carried out in the solid phase, the granulate or other shaped particles of the arylene sulphide polymers according to the invention may be after-treated at temperatures from 180° to 260° C., preferably from 220° to 260° C. The reaction time for this after-treatment is 0.5 to 20 hours, preferably 1 to 15 hours.

The arylene sulphide polymers according to the invention may be prepared in an inert gas atmosphere (e.g. $N_2$) or in air at pressures in the range of from $10^{-2}$ to $10^3$ bar.

The arylene sulphide polymers according to the invention may contain additives such as reinforcing materials (glass fibres, mineral fillers, etc.), carbon black, plasticizers, stabilizers, pigments, nucleating agents, mould release agents etc.

The arylene sulphide polymers prepared according to the invention, preferably polyphenylene sulphides, are suitable for the preparation of moulded articles and may be worked up by injection moulding, extrusion, etc. to form moulded products, sheet products, semi-finished products, fibres, monofilaments, filaments and sheet-like fabrics.

In addition to increased melt viscosity they can also have the advantage of increased resistance to UV-radiation. An elegant method of determining the scale of bond breakage as a result of ultraviolet light is to measure the concentration of free radicals under radiation, for example by means of ESR spectroscopy.

EXAMPLES

Example 1

50 g of PPS granulate having a fusion viscosity of 18 Pas at 320° C. and a shear gradient of about $1-10\ s^{-1}$ were mixed with 5.5 g (10% by weight) of 3,5-dinitrobenzoic acid-(2)hydroxyethyl ester) in a 250 ml round bottomed flask and the mixture was heated to 320° C. under $N_2$. Stirring was continued for a further 30 minutes at this temperature after the mixture had melted. After completion of the reaction the heating bath was removed, the flask was taken down and the PPS was chopped up when cold. The fusion viscosity was 102 Pas (580% of the initial value; hereinafter referred to only by the FIGURE, e.g. +580%).

After 12 minutes shearing (about $1-10\ s^{-1}$, 320° C.), the fusion viscosity was 1450 Pas (+8000%).

Example 2

PPS was after-treated with 10% by weight of 1,3-dinitrobenzene in the manner described in Example 1. The fusion viscosity of the PPS was 62 Pas (+340%). After the 12 minutes shearing (about $10^{-1}$, 320° C.), the fusion viscosity was 124 Pas (+690%).

Example 3

PPS was after-treated with 10% by weight of 4,4'-dinitrobenzanilide as described in Example 1. The fusion viscosity was 35 Pas (+195%).

Example 4 PPS was after-treated with 10% by weight of 2,2'-isopropylidene-bis-(4-nitrophenyloxy)-benzene by the method described in Example 1. The fusion viscosity was 29 Pas (+160%).

Example 5

PPS (fusion viscosity=12 Pas, $10\ s^{-1}$, 320° C.) was after-treated with 10% by weight of 1,4-bis-(4-nitrobenzoyl)-1,4-phenylene diamine as described in Example 1. The fusion viscosity was 70 Pas (+580%).

Example 6

PPS (fusion viscosity=24 Pas, about $1-10\ s^{-1}$, 320° C.) was after-treated with 10% by weight of 3-nitrobenzene sulphonamide by the method described in Example 1. The fusion viscosity was 85 Pas (+350%).

Example 7

PPS (fusion viscosity=44 Pas, $1000\ s^{-1}$, 310° C.) was after-treated with 10% by weight of sodium 3-nitrobenzene sulphonate as described in Example 1. The fusion viscosity was 150 Pas (+340%).

Example 8

PPS having a fusion viscosity of 38 Pas was after-treated with 10% by weight of 4-nitrodiphenylamine at 320° C. and a shear gradient of 2.26 $s^{-1}$ as described in Example 1. The fusion viscosity of the PPS was 190 Pas (+500%) at 2.26 $s^{-1}$.

Comparison Example 1

PPS was after-treated as described in Example 1 without the addition of a nitro compound according to the invention. In this case there was no change in the fusion viscosity.

Comparison Example 2

PPS (fusion viscosity=44 Pas, $1000\ s^{-1}$, 310° C.) was after-treated with 10% by weight of sodium benzene sulphonate in the manner described in Example 1. The fusion viscosity was 25 Pas.

The examples show that the nitro compound to be used according to the invention are very suitable for increasing the molecular weight of arylene sulphide polymers by after-treatment.

Example 9

The granulate used in Example 8 a was after-treated with 10% by weight of 4,4'-dinitrophenylamine as described in Example 1. The fusion viscosity was about 600 Pas (+1600%).

After 16 minutes' shearing at 320° C. and about 2 $s^{-1}$, the fusion viscosity wa about 1700 Pas (+4500%).

Example 10

The PPS granulate used in Example 8 was after-treated with 5% of 3,5-dinitrobenzoic acid stearylamide by the method described in Example 1. The fusion viscosity was 71 Pas (+185% (10 $s^{-1}$).

Examples 11 and 12

The PPS granulate used in Example 8 was after-treated with 1% (Example 11) and 2% (Example 12) of 4,4'-dinitrobenzophenolate in the manner described in Example 1. The fusion viscosity was 180 Pas (+470%, Example 11 and 300 Pas (+790%, Example 12).

After 16 minutes shearing (Example 12) the fusion viscosity was 580 Pas (+1500%).

Example 13

The high molecular weight PPS obtained in Example 2 was heated to 250° C. in the solid phase under nitrogen for 7 hours. The fusion viscosity thereby increased from 62 Pas to 380 Pas (+610%)

Example 14

Flakes of PPS are scraped from a solidified melt, obtained according to Example 10, with the aid of a corundum scraper and are filled into an ESR tube (diameter: 3 mm). After a period of several days the tube is irradiated in air at −110° C. with a 500 W Hg lamp, the shortwave section (<305 nm) of which has been filtered out. The low temperature prevents the free radicals produced by the radiation from reacting further.

The difference between the radicals formed in 60 minutes and those formed in 30 minutes is selected as the criterion of the rate of radical formation. The difference is :0 (relative figures). This can be determined by ESR-spectroscopy.

Comparative Example 3

The rate of radical formation of PPS is determined in the same manner.

The difference is :184 (relative figures).

We claim:

1. High molecular weight polymer obtained by melt mixing of 80–99.9% by weight, of arylene sulphide polymer containing at least one of the formulae (I)–(V):

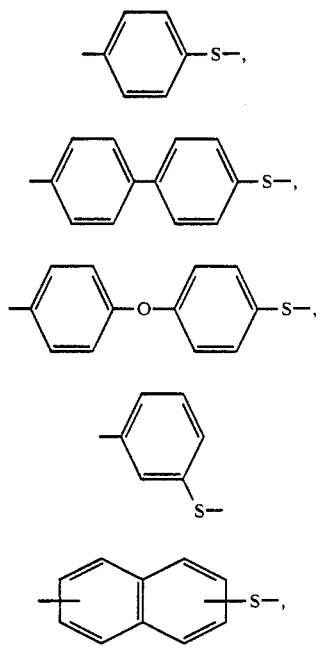

with 0.1 to 20% by weight of one or both of a high boiling aromatic polynitro compound or mononitro compound containing at least one additional substituent reactable with the arylene sulphide polymer, optionally followed by a solid phase after-treatment at elevated temperature, the boiling points of which nitro compounds is at least 250° C., and in the mononitro compounds when the additional substituent capable of reacting with the arylene sulphide polymer is an $SO_3$ group, the mononitro compound is the sodium salt of 3-nitrobenzene sulphonic acid, the potassium salt of 3-nitrobenzene sulphonic acid, the calcium salts of 3-nitrobenzene sulphonic acid, the magnesium salts of 3-nitrobenzene sulphonic acid, the potassium salt of 2-nitrobenzene sulphonic acid, the sodium or potassium salt of 2-methyl-5-nitrobenzene sulphonic acid, the sodium or potassium salt of 4-methyl-3-nitrobenzene sulphonic acid or the sodium, potassium, or ammonium salt of 5-nitro-2-naphthalene sulphonic acid.

2. Polymer according to claim 1, characterised in that the mononitro compounds contain, as additional substituent capable of reacting with arylene sulphide polymer, $SO_3H$, $SO_2Cl$, SH, $NO_2$, $SO_2NH_2$, $SO_3^\ominus K^\oplus$, $SO_3^\ominus Na^\oplus$, NHAr in which Ar stands for an optionally substituted aryl group containing 6 to 14 carbon atoms.

3. Polymer according to claim 1, characterised in that the nitro compounds contain one or more electron accepting substituents.

4. Polymer according to claim 1 wherein the after-treatment temperature is from 180° to 260° C.

5. Polymer according to claim 1 which contains 85 to 99.5% by weight of arylene sulphide polymer.

6. Polymer according to claim 1 which contains 88 to 99% by weight of arylene sulphide polymer.

7. Polymer according to claim 1 wherein the arylene sulphide polymer is polyparaphenylene sulphide.

8. Polymer according to claim 1 wherein the polynitro compound is halogen-free.

9. Polymer according to claim 2 wherein Ar is phenyl.

10. Polymer according to claim 3 wherein the electron accepting substituent is ester amide or carboxyl.

11. Polymer according to claim 4 wherein the after-treatment temperature is 220° to 260° C.

12. A film, molded article, fiber, filament or sheet-like fabric of the polymer of claim 1.

* * * * *